United States Patent [19]

Jungkman et al.

[11] Patent Number: 4,898,435

[45] Date of Patent: Feb. 6, 1990

[54] DARK MIRROR COATED PRISM

[75] Inventors: David L. Jungkman, Hudson, N.H.; David M. Comey, Condord; Ronald D. Stern, Newton, both of Mass.; Bruce L. Musicant, Concord, Mass.

[73] Assignee: Honeywell Inc., Minneapolis, Minn.

[21] Appl. No.: 211,312

[22] Filed: Jun. 24, 1988

[51] Int. Cl.⁴ .......................... G02B 5/04; G01J 1/04; G01J 5/06; G01J 5/08

[52] U.S. Cl. ..................................... 350/1.1; 350/286; 250/352

[58] Field of Search ............ 350/1.1, 286, 172, 276 R, 350/276 SL; 250/352, 332, 349

[56] References Cited

U.S. PATENT DOCUMENTS

| 2,718,175 | 9/1955 | Gim | 350/637 |
|---|---|---|---|
| 3,963,926 | 6/1976 | Borrello | 250/332 |
| 4,171,875 | 10/1979 | Taylor et al. | 350/637 |
| 4,446,372 | 5/1984 | Gurnee | 250/352 |
| 4,555,163 | 11/1985 | Wagner | 350/172 |
| 4,575,203 | 3/1986 | Brandt et al. | 350/631 |
| 4,609,820 | 9/1986 | Miyamoto | 250/352 |
| 4,640,590 | 2/1987 | Wunsch | 350/637 |
| 4,812,655 | 3/1989 | Jungkman et al. | 250/352 |
| 4,814,620 | 3/1989 | Comey et al. | 250/352 |
| 4,834,522 | 5/1989 | Janowicz | 350/637 |

FOREIGN PATENT DOCUMENTS

| 2736900 | 3/1979 | Fed. Rep. of Germany | 350/637 |
|---|---|---|---|
| 2856612 | 7/1980 | Fed. Rep. of Germany | 248/486 |
| 2932146 | 2/1981 | Fed. Rep. of Germany | 350/637 |
| 3207200 | 9/1983 | Fed. Rep. of Germany | 350/637 |
| 3341426 | 5/1985 | Fed. Rep. of Germany | 350/632 |
| 3509653 | 9/1986 | Fed. Rep. of Germany | 350/637 |
| 3509654 | 9/1986 | Fed. Rep. of Germany | 350/637 |
| 4509655 | 9/1986 | Fed. Rep. of Germany | 350/637 |
| 3533676 | 3/1987 | Fed. Rep. of Germany | 350/637 |
| 185340 | 10/1983 | Japan | 350/637 |

Primary Examiner—Jon W. Henry
Attorney, Agent, or Firm—Haugen and Nikolai

[57] ABSTRACT

An improved prism cold shield for use in an infrared detection system which includes a detector array comprised of a plurality of detectors sensitive to a radiation of interest in a predetermined wavelength band. The prism comprises a substrate having a top surface partially coated with a first coating layer arranged to define a plurality of bow-like stripes alternating with top surface openings which are covered by a second coating layer. The substrate has a bottom surface partially coated with a third coating layer in a pattern to define a line of windows on the bottom surface which are aligned with the top surface openings so as to define a field of view for the plurality of detectors. The first and third coating layers ae comprised of high absorption, low reflectivity coatings in the wavelength band of the radiation of interest and the second coating layer is an anti-reflective coating.

3 Claims, 1 Drawing Sheet

U.S. Patent Feb. 6, 1990 4,898,435
*Fig. 1a*
*Fig. 1c*
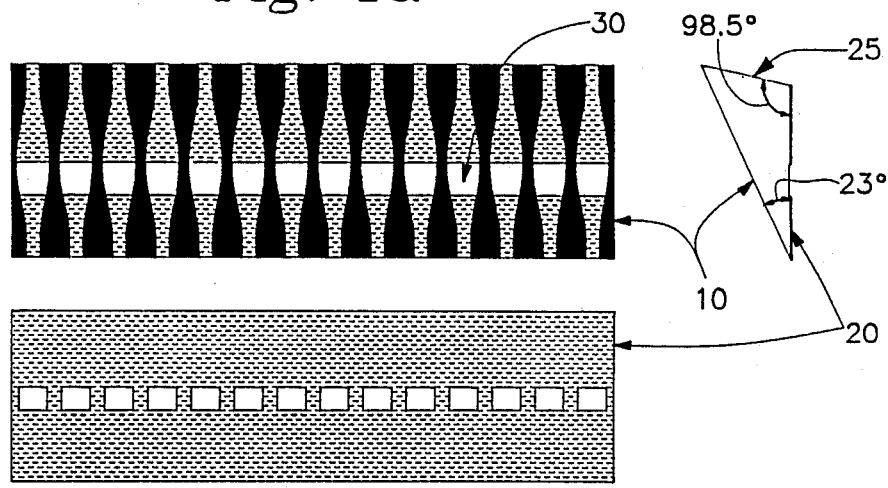
*Fig. 1b*
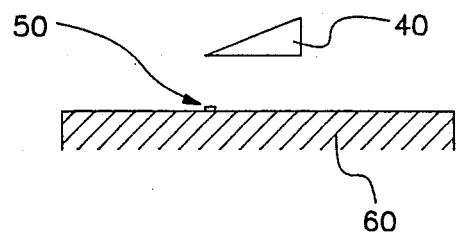
*Fig. 2*

DARK MIRROR COATED PRISM

This application is related to my co-pending application Ser. No. 07/130,699, filed Dec. 28, 1987 and entitled "Prism Cold Shield" now U.S. Pat. No. 4,812,655.

FIELD OF THE INVENTION

This invention relates to prisms for controlling reflection and diffraction in the plane of infrared detectors and, more particularly, to dark mirror coated prisms, that is, prisms with high absorption low reflectivity coatings, which also perform as cold shields as used in Forward Looking Infrared Devices (hereinafter called "FLIRS").

BACKGROUND OF THE INVENTION

The invention is directed to infrared systems. Infrared detectors as used in current infrared systems, such as FLIRS, are presented with two types of radiation: (1) radiation of interest and (2) background noise. In general, a cold shield is a blocker which blocks background radiation to allow the infrared detector being shielded a better background for detecting radiation of interest. The effectiveness of a cold shield is dependent upon its geometry and position with respect to the detectors.

The prior art for controlling reflection and diffraction in the plane of infrared detectors involves tilting the detector array and dark mirror coating the area around the detectors. This area is not flat so the dark mirror coating (hereinafter called "DMC") performance is not repeatable nor reliable. The prism of the invention is a novel approach to the control of reflection and diffraction because it tilts the surface of the detector array optically. DMCs are applied to the prism surfaces which are flat and smooth. This provides optimum performance of the DMCs. DMCs on the prism can be configured to hide the metal contacts of the detector array and provide increased detectivity (hereinafter called "D*") by cold shielding the detectors between elements.

BRIEF DESCRIPTION OF THE DRAWING

FIGS. 1a, 1b, and 1c are a schematic view of the dark mirror coated prism of the present invention showing the front surface, the back surface, and the side view, respectively.

FIG. 2 is a schematic side view of the dark mirror coated prism and detector array assembly.

SUMMARY OF THE INVENTION

An improved prism cold shield for use in an infrared detection system including a detector array comprised of a plurality of detectors and sensitive to a radiation of interest in a predetermined wavelength band is provided. The improved prism cold shield comprises a substrate having a top surface partially coated with a first coating layer arranged to define a plurality of bow-like stripes alternating with top surface openings which are covered by a second coating layer. The substrate has a bottom surface partially coated with a third coating layer in a pattern to define a line of windows on the bottom surface which are aligned with the top surface openings so as to define a field of view for the plurality of detectors. The first and third coating layers are comprised of high absorption, low reflectivity coatings in the wavelength band of the radiation of interest and the second coating layer is an anti-reflective coating.

DETAILED DESCRIPTION OF THE PREFERRED EMBODIMENT

Referring now to FIG. 1, the prism of the present invention is shown schematically with the front surface, back surface, and side view of the prism. The prism may preferably be manufactured in the shape of a wedge or other suitable prismatic shape. A first opaque DMC layer is deposited on the front surface 10 of the prism 40 such that a plurality of windows 30 are left uncoated on the front surface 10. A second opaque DMC layer is similarly deposited on the back surface 20 of the prism 40 such that, in combination with the first layer on the front surface 10, the windows in the front and back surfaces define the FOV for a detector array comprised of a plurality of infrared detectors 50 located in the focal plane (shown in FIG. 2).

The prism may be comprised of zinc sulfide or other optical materials as determined by the optical requirements of the system it is used in. The prism material and size are chosen to support the optical system imaging requirements as well as to minimize reflection from the focal plane assembly by providing an apparent optical tilt to the focal plane.

The shape of the DMC on surface 10 is, in part, determined by the optical foot print of the detector active area (which is the window in the DMC on surface 20). The specific prism materials used and the optical design determines the shape. In the scan direction, perpendicular edges create diffraction and must be eliminated. The opening in the DMC, therefore, looks like a stripe with unusual angles caused by the optical field of view of the detector.

The angles of the prism are designed to reject external radiation outside of the FOV of the detector, and to prevent radiaton entering the bottom of the prism, by reflection from the focal plane, from exiting the top surface into the FOV of the optical system. This is accomplished by total internal reflection thereby redirecting the radiation out of the side surface of the prism. Typically, the angle between surfaces 10 and 20 may be advantageously constructed to be about 23 degree for use at infrared frequencies. The prism cold shield substrate also has a side surface 25 located opposite to the adjoining edges of the top and bottom surfaces. The side and bottom surfaces have adjoining edges which form an interior angle of about 98.5 degrees. Reflections off the bottom side anti-reflective coating are also redirected by total internal reflection due to the optical tilt of the detector array 50. The opaque DMC layers may be comprised of a combination of metals and dielectrics or be solely comprised of metals or be solely comprised of dielectrics. The "dark" side of the DMC is applied to the prism surfaces so the coating is dark as viewed from the substrate. The thickness of the DMC is adjusted to minimize edge scatter. In one embodiment of the present invention, the windows 30 in the DMCs on surfaces 10 and 20 define the detector active area, and the areas of the prism not covered with DMC are anti-reflective coated. Such anti-reflective coatings are well known in the art and may be multilayered or single layers. The anti-reflective coating and the DMC are adjusted to have the same reflection at the wavelength of interest to minimize diffraction.

Referring now to FIG. 2, a prism 40 is shown mounted by conventional mounting means over a plurality of infrared detectors 50, which are, in turn, carried on a detector substrate 60. Such detectors are well known and may preferably be comprised of cadmium mercury telluride material. The detectors 50 are suitably positioned such that the windows 30 define the FOV for the detectors.

In one embodiment of the invention, the prism 40 is mounted about 0.001 inches above the detector array. The edge of the DMC window 30 scatters rather than specularly reflects the incident radiation thereby reducing reflection of the incident radiation. The surfaces below the DMC window then reflect the scattered radiation. The greater the distance between the prism and the detector, the smaller the component of the scattered radiation that can be reflected and re-enter the prism. At a distance of about 0.001 inches, the DMC between windows on surface 20 and between stripes on surface 10 block background radiation from the detector. This provides reduced background radiation and therefore higher D*. Typically, the prism may be mounted on support posts (not shown) located off the end of the detector array. Such support posts are usually manufactured as an integral part of the detector array.

While there has been shown and described a preferred embodiment of the invention, those skilled in the art will appreciate that various changes and modifications may be made to the illustrated embodiment without departing from the true spirit and scope of the invention which is to be determined from the appended claims.

The embodiments of the invention in which an exclusive property or right is claimed are defined as follows:

1. In an infrared detection system including a detector array comprised of a plurality of detectors and sensitive to a radiation of interest in a predetermined wavelength band, an improved prism cold shield comprising a substrate having a top surface partially coated with a first coating layer arranged to define a plurality of bow-like stripes alternating with top surface openings which are covered by a second coating layer, and further having a bottom surface partially coated with a third coating layer in a pattern to define a line of windows on the bottom surface which are aligned with the top surface openings so as to define a field of view for the plurality of detectors, wherein the first and third coating layers are comprised of high absorption low reflectivity coatings in the wavelength band of the radiation of interest and the second coating layer is an anti-reflective coating.

2. The improved prism cold shield of claim 1 wherein the top surface and the bottom surface have adjoining edges which form an interior angle of about 23 degrees.

3. The improved prism cold shield of claim 1 wherein the substrate has a side surface located opposite to the adjoining edges of the top and bottom surfaces wherein the side and bottom surfaces have adjoining edges which form an interior angle of about 98.5 degrees.

* * * * *

UNITED STATES PATENT AND TRADEMARK OFFICE
CERTIFICATE OF CORRECTION

PATENT NO. : 4,898,435

DATED : February 6, 1990

INVENTOR(S) : Jungkman, et al

It is certified that error appears in the above-identified patent and that said Letters Patent is hereby corrected as shown below:

Column 4, line 25, in Claim 3, the dependency should read -- 2 --.

Signed and Sealed this

Twenty-second Day of January, 1991

Attest:

HARRY F. MANBECK, JR.

*Attesting Officer*  *Commissioner of Patents and Trademarks*